(12) United States Patent
Zhao et al.

(10) Patent No.: US 10,118,605 B2
(45) Date of Patent: Nov. 6, 2018

(54) METHODS AND SYSTEM FOR A HYBRID VEHICLE

(71) Applicant: Ford Global Technologies, LLC, Dearborn, MI (US)

(72) Inventors: Yanan Zhao, Ann Arbor, MI (US); Ming Lang Kuang, Canton, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/457,771

(22) Filed: Mar. 13, 2017

(65) Prior Publication Data
US 2018/0257634 A1 Sep. 13, 2018

(51) Int. Cl.
  *B60W 20/14* (2016.01)
  *B60K 6/36* (2007.10)
  *B60K 6/26* (2007.10)

(52) U.S. Cl.
  CPC ............ *B60W 20/14* (2016.01); *B60K 6/26* (2013.01); *B60K 6/36* (2013.01); *B60Y 2200/92* (2013.01); *B60Y 2300/18125* (2013.01); *B60Y 2300/43* (2013.01); *B60Y 2300/91* (2013.01); *B60Y 2400/60* (2013.01); *Y10S 903/906* (2013.01); *Y10S 903/909* (2013.01)

(58) Field of Classification Search
  CPC .......... B60W 20/14; B60K 6/36; B60K 6/26; B60Y 2400/60; B60Y 2300/91; B60Y 2300/43; B60Y 2300/18125; B60Y 2200/92; Y10S 903/99; Y10S 903/906
  See application file for complete search history.

(56) References Cited

U.S. PATENT DOCUMENTS

| | | | |
|---|---|---|---|
| 4,974,875 A | 12/1990 | Sugasawa et al. | |
| 6,681,180 B2 | 1/2004 | Bevly et al. | |
| 6,959,971 B2 | 11/2005 | Tsunehara | |
| 7,034,482 B2 * | 4/2006 | Komiyama | B60K 6/46 180/65.24 |
| 7,774,103 B2 | 8/2010 | Deng et al. | |
| 9,297,455 B2 | 3/2016 | Li | |
| 2002/0163250 A1 | 11/2002 | Huls et al. | |
| 2013/0265012 A1* | 10/2013 | Kaefer | B60W 10/06 320/138 |
| 2014/0148983 A1* | 5/2014 | Kim | B60W 20/1062 701/22 |

(Continued)

OTHER PUBLICATIONS

Zhao, Yanan, et al., "Methods and System for Hybrid Vehicle Regenerative Braking," U.S. Appl. No. 15/457,695, filed Mar. 13, 2017, 67 pages.

(Continued)

*Primary Examiner* — Michael J Zanelli
(74) *Attorney, Agent, or Firm* — David Kelley; McCoy Russell LLP

(57) ABSTRACT

Methods and systems are provided for operating a driveline of a hybrid vehicle that includes an internal combustion engine, a rear drive unit electric machine, an integrated starter/generator, and a transmission are described. In one example, charging of an electric energy storage device may be allocated between the rear drive unit electric machine and the integrated starter/generator to increase charge stored in the electric energy storage device.

19 Claims, 10 Drawing Sheets

(56) References Cited

U.S. PATENT DOCUMENTS

2014/0297120 A1    10/2014  Cotgrove
2015/0183324 A1*   7/2015   Park .......................... B60L 7/18
                                                              701/22
2015/0298702 A1    10/2015  Reinisch et al.

OTHER PUBLICATIONS

Fodor, Michael Glenn, et al., "Methods and System Providing Vehicle Drift," U.S. Appl. No. 15/457,815, filed Mar. 13, 2017, 59 pages.
Ortmann, Walter Joseph, et al., "Methods and System for Operating a Hybrid Vehicle," U.S. Appl. No. 15/457,860, filed Mar. 13, 2017, 55 pages.

* cited by examiner

METHODS AND SYSTEM FOR A HYBRID VEHICLE

FIELD

The present description relates generally to methods and systems for controlling a driveline of a hybrid vehicle. The methods and systems may be particularly useful for hybrid vehicles that include two electric machines in the hybrid vehicle's driveline.

BACKGROUND/SUMMARY

A hybrid vehicle may include an engine and an electric machine to propel the hybrid vehicle. The engine may be operated during higher torque demands and the electric machine may be operated solely at lower torque demands and in combination with the engine at higher torque demands. The electric machine may also convert the hybrid vehicle's kinetic energy into electrical energy that may be used at a later time. The electrical energy that is converted from the hybrid vehicle's kinetic energy may be important for restoring charge in the vehicle's battery so that the electric machine may continue to provide positive torque to the hybrid vehicle driveline after the hybrid vehicle has been driven for longer distances. In addition, if the hybrid vehicle is driven on a closed track for racing or other demonstration purposes, there may be fewer opportunities to charge the battery via the electric machine because vehicle deceleration may transfer normal forces from driven wheels to non-driven wheels. Therefore, it may be desirable to increase the opportunities to provide charge from an electric machine to vehicle batteries or other electric energy storage devices.

The inventors herein have recognized the above-mentioned issues and have developed a driveline operating method, comprising: charging an electric energy storage device solely via a rear drive unit electric machine in response to a regenerative torque of the rear drive unit electric machine not being substantially equal to a rear drive unit electric machine torque threshold; and charging an electric energy storage device via the rear drive unit electric machine and an integrated starter/generator in response to a regenerative torque of the rear drive unit electric machine being substantially equal to the rear drive unit electric machine torque threshold.

Electric charge may be provided to a battery or other alternative electric energy storage device solely via a rear drive unit when the amount of requested regenerative braking is low. However, when higher amounts of regenerative braking are requested, the battery may be supplied charge via a rear drive unit electric machine and an integrated starter/generator. Thus, battery charging may be performed with more than one electric machine in the driveline. Further, the rear drive unit may be assigned a higher battery charging priority level so that the life of the second electric machine may be extended.

The present description may provide several advantages. In particular, the approach may improve coordination of electric machines used for regenerative braking. Additionally, the approach may increase an amount of charge that may be supplied to a battery when a vehicle is operated on a closed race or testing road circuit. Further, the approach may change ways charge may be delivered to a battery in response to urgency of recharging the vehicle's battery.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
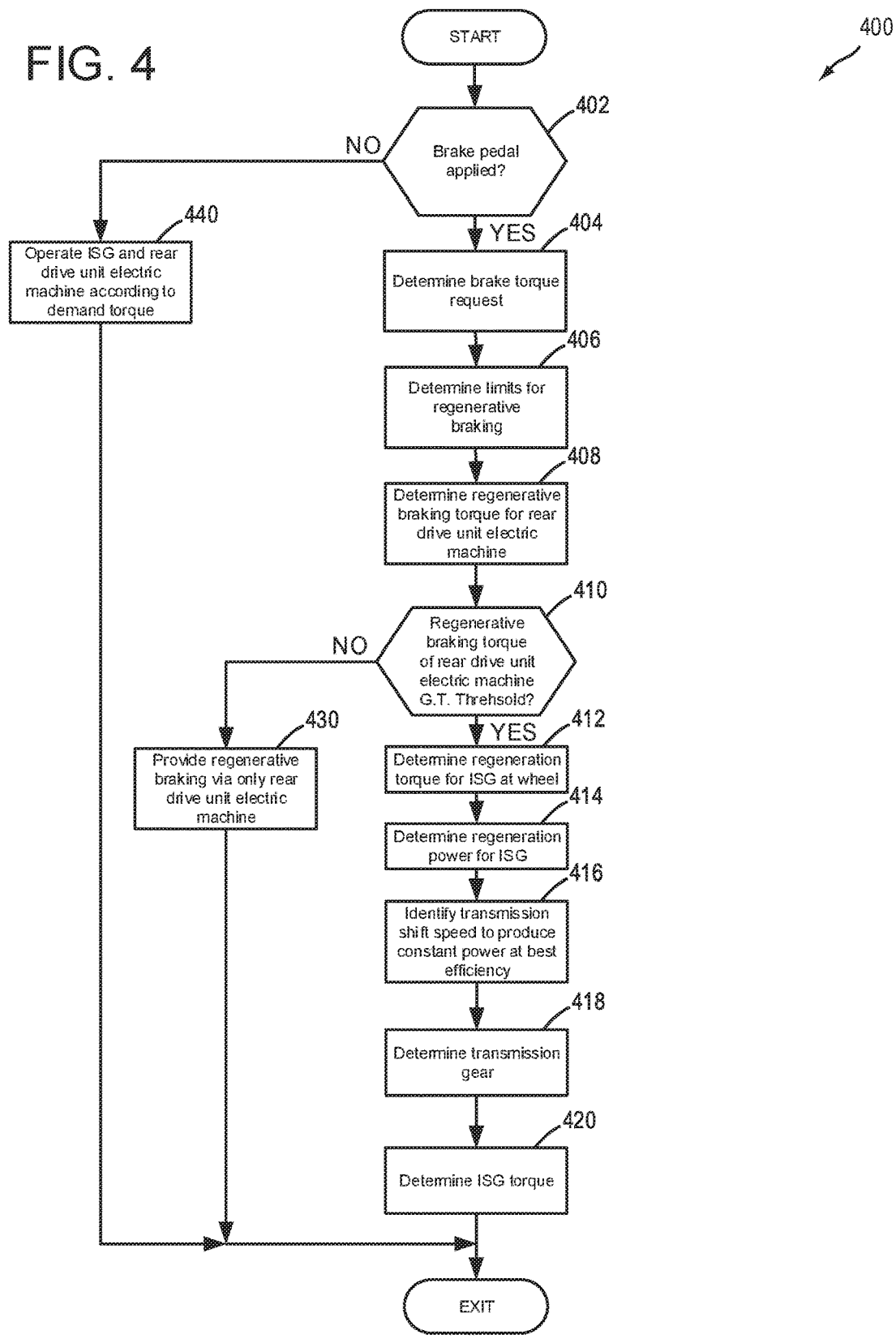
FIG. 4 is a flowchart of a first method for controlling regenerative braking of a hybrid vehicle.
Figure 5:
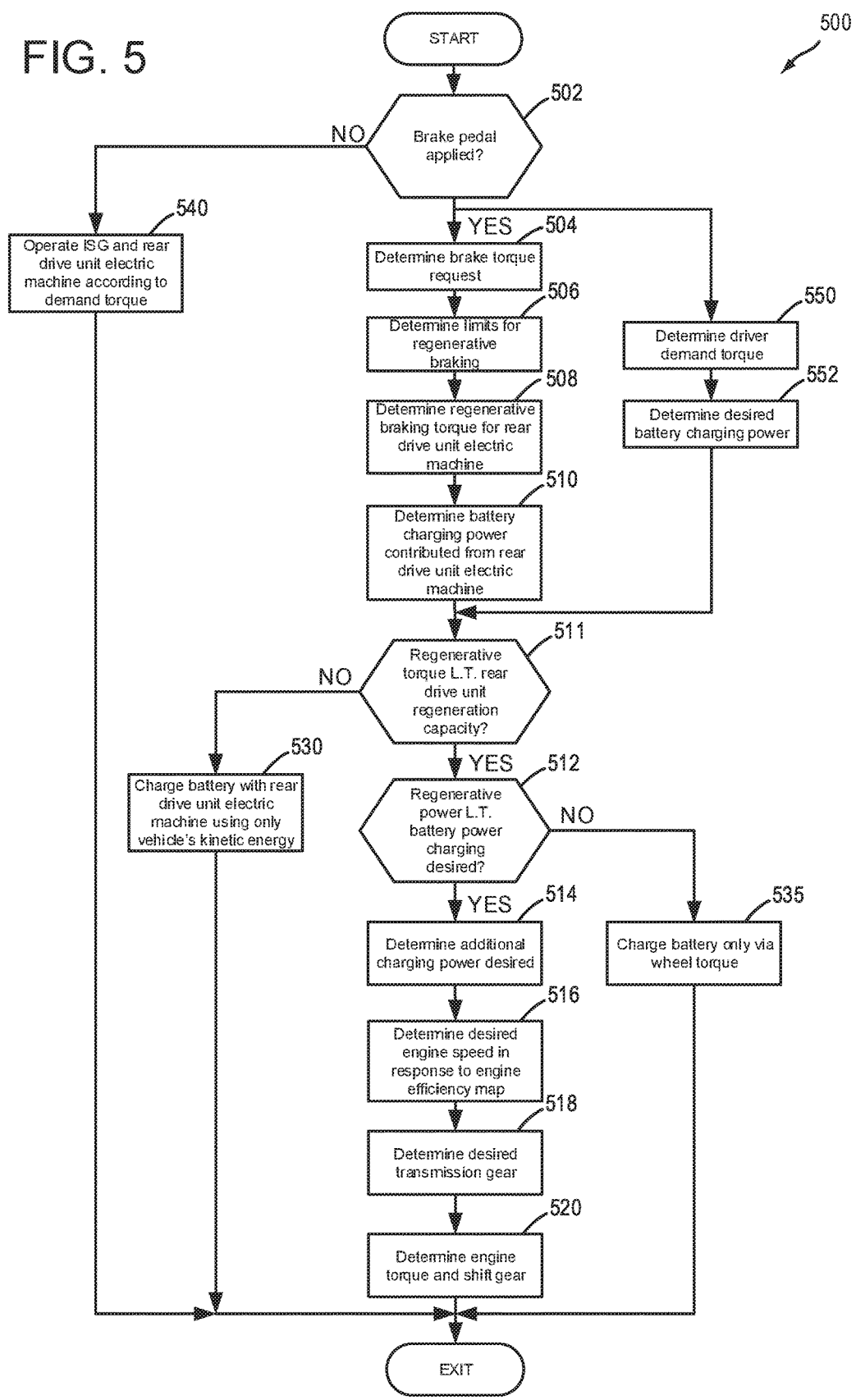
FIG. 5 is a flowchart of a second method for controlling regenerative braking of a hybrid vehicle is shown.
Figure 6:
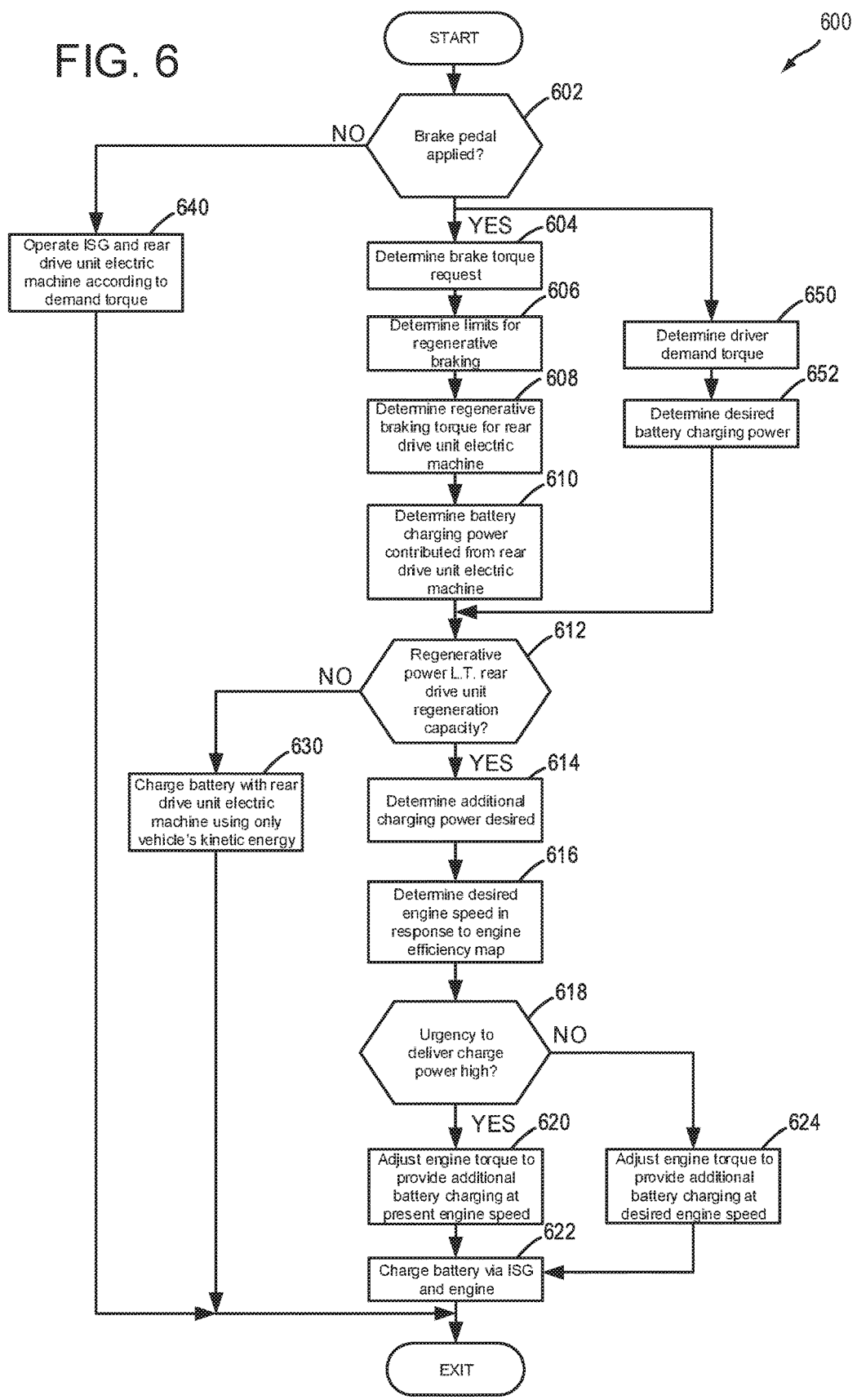
FIG. 6 is a flowchart of a third method for controlling regenerative braking of a hybrid vehicle is shown.
Figure 7:
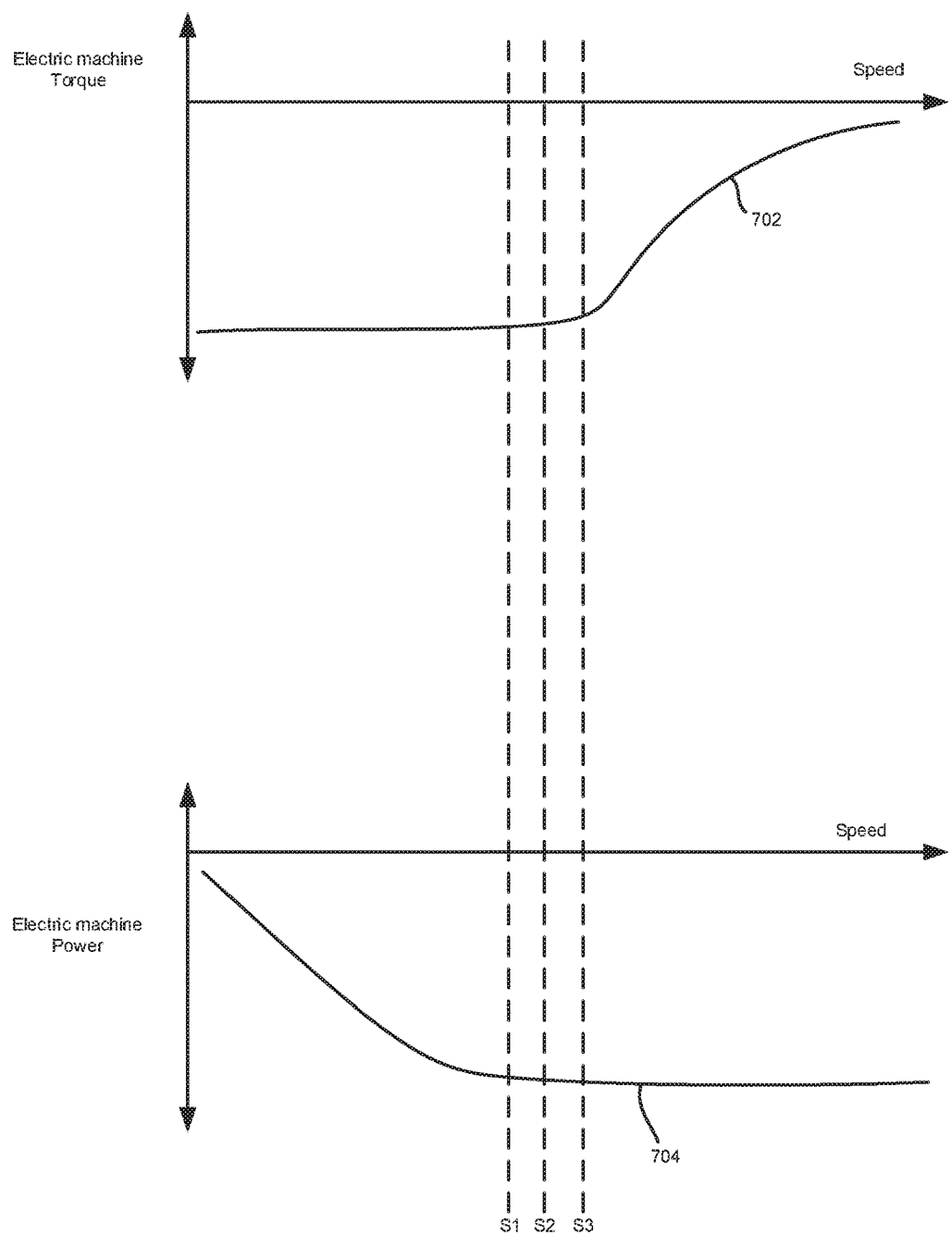
FIG. 7 shows example plots of electrical machine torque and power characteristics.
Figure 8:
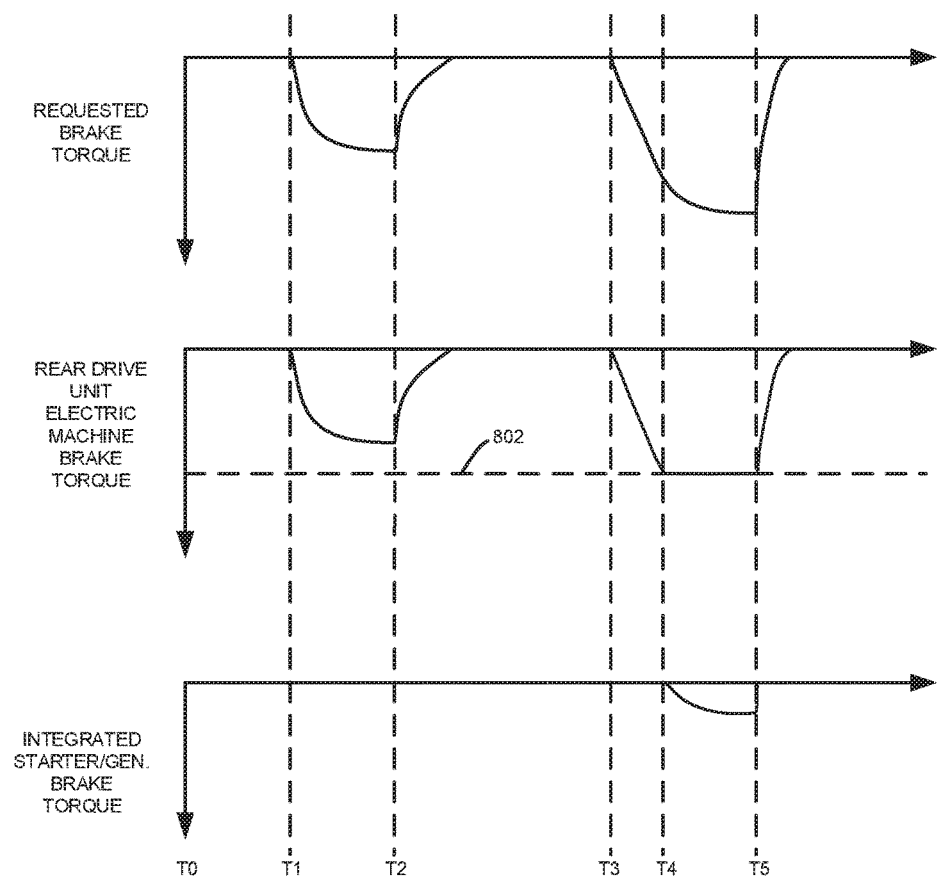
FIG. 8 shows a prophetic driveline operating sequence for the method of FIG. 4.
Figure 9:
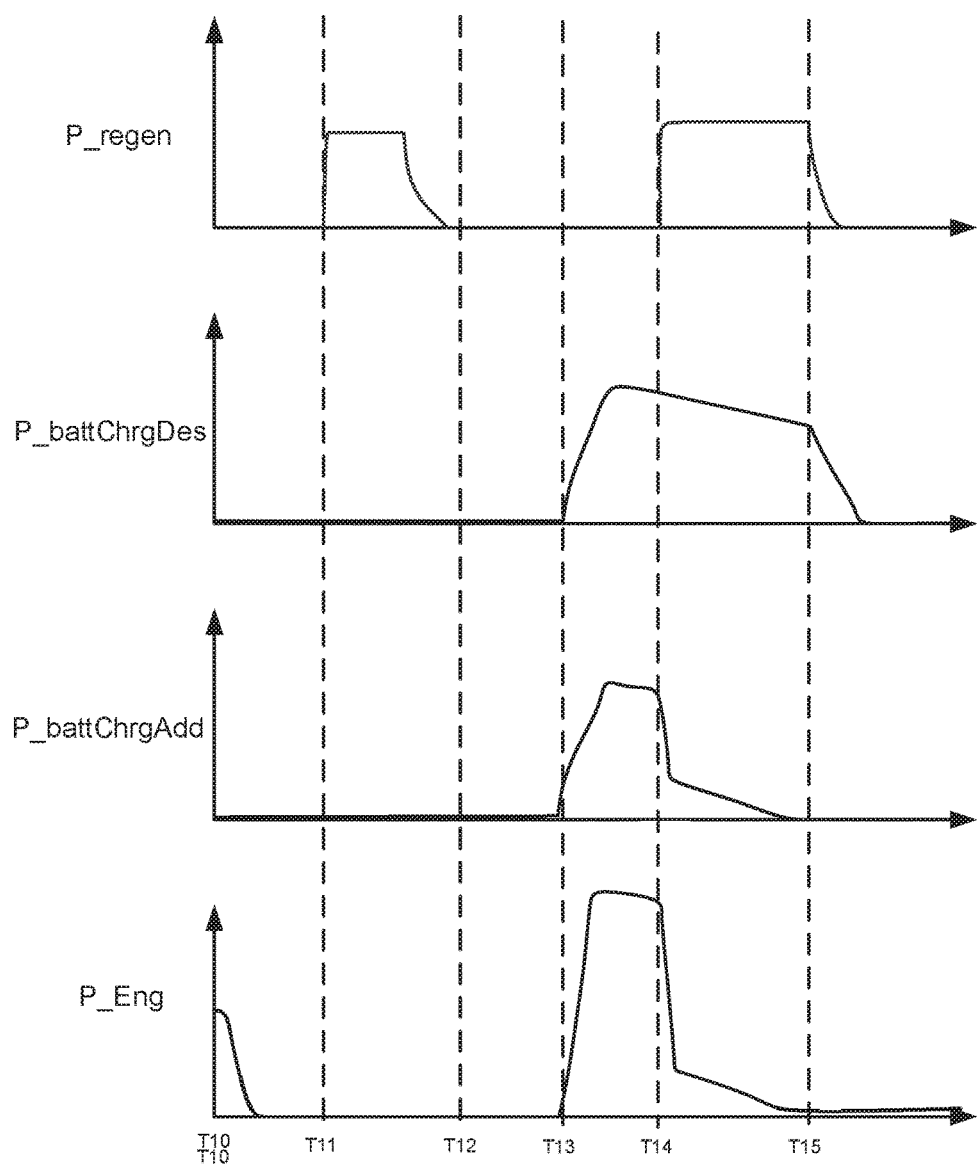
FIG. 9 shows a prophetic driveline operating sequence for the method of FIG. 5.

The following description relates to systems and methods for operating a driveline of a hybrid vehicle. FIGS. 1A-3 show an example hybrid vehicle system that includes a driveline with a motor, an integrated starter/generator, a dual clutch transmission, and a rear drive unit with an electric machine that is positioned downstream of the dual clutch transmission. FIGS. 4-6 show methods for controlling regenerative braking of a hybrid vehicle. Operating characteristics of an electric machine are shown in FIG. 7. Prophetic sequences according to the methods described are shown in FIGS. 8 and 9.

Figure 1A:
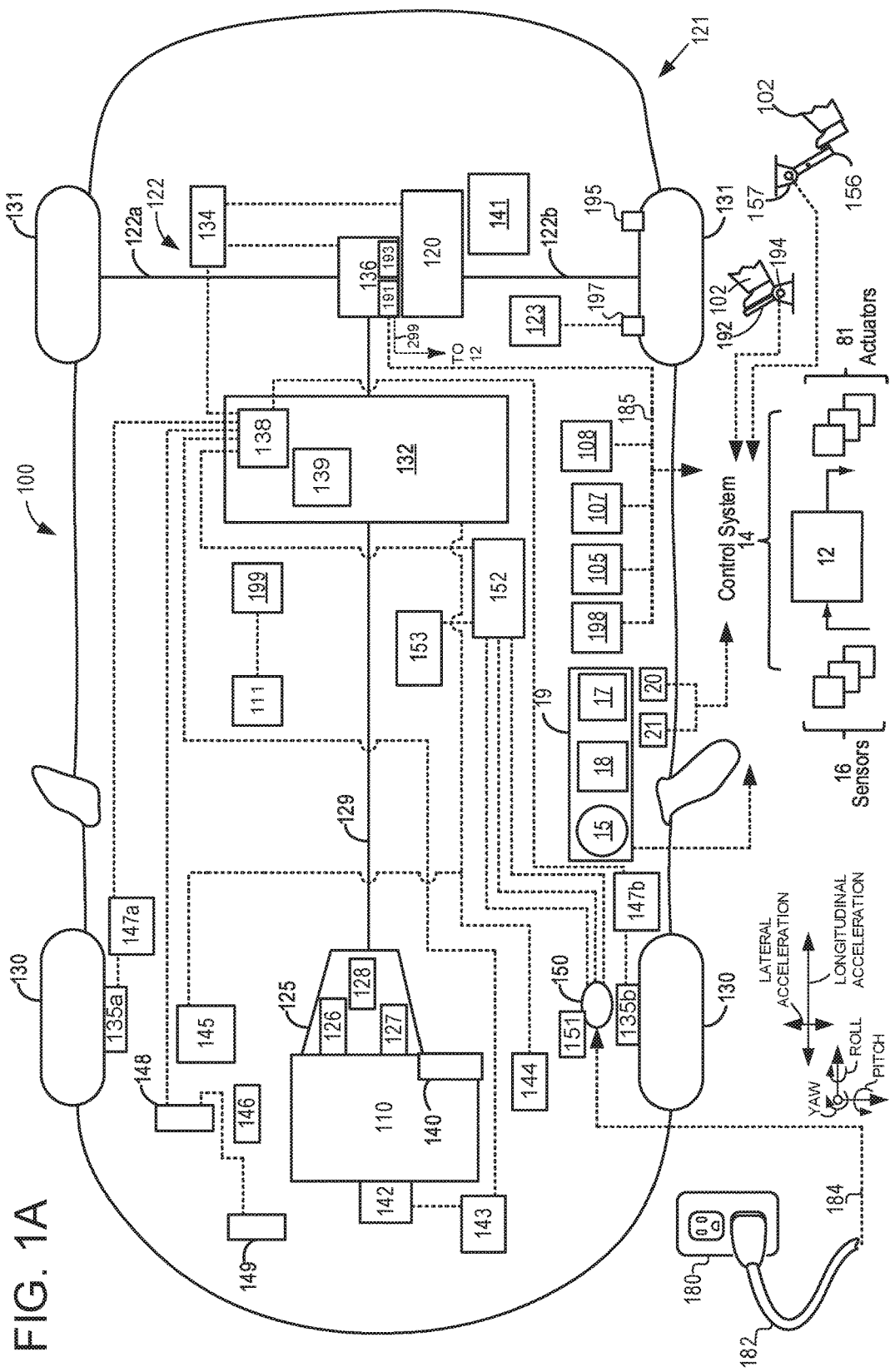
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122*a*, and second half shaft 122*b*. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a torque capacity of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131. Rear drive unit 136 may be directly coupled to electric machine 120 and axle 122.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120 or integrated starter/generator 142. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM)

(not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights) or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130. Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147b may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include a vehicle audible sounder for pedestrians (VASP). For example, VASP may be configured to produce audible sounds via sounders. In some examples, audible sounds produced via VASP communicating with sounders may be activated responsive to a vehicle operator triggering the sound, or automatically, responsive to engine speed below a threshold or detection of a pedestrian.

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
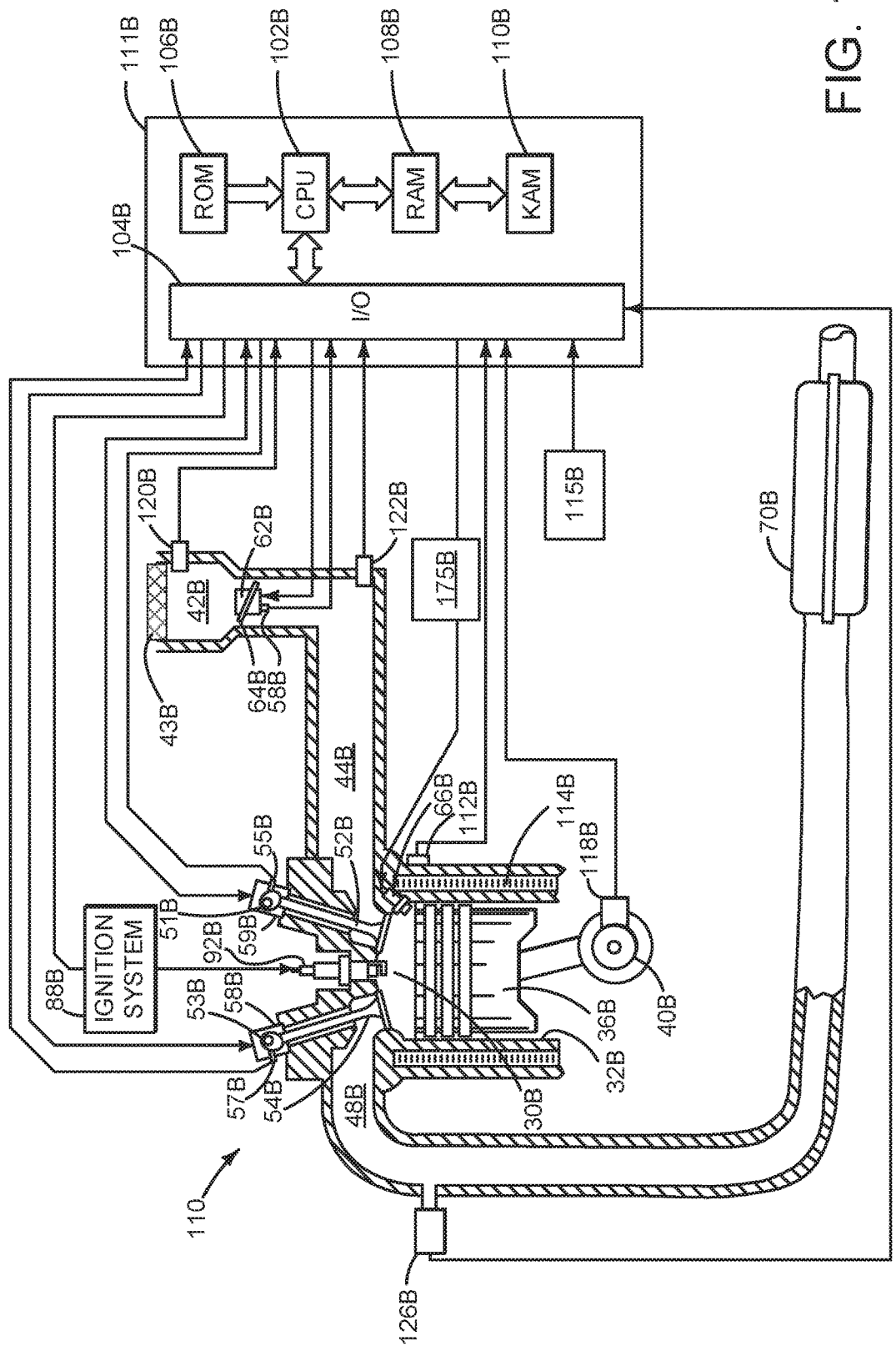
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined.

Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
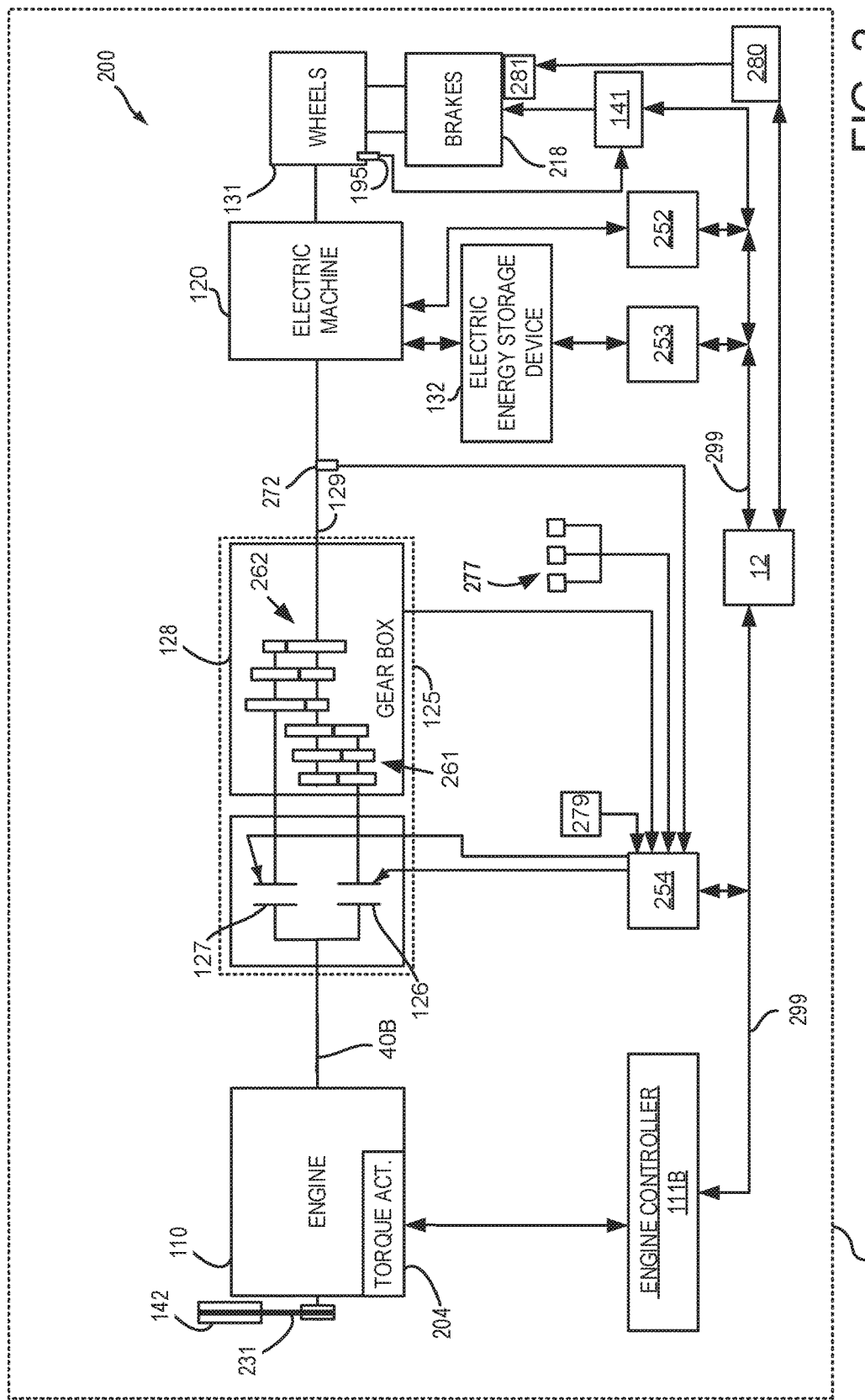
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIG. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream if transmission 125. Transmission 125 is positioned upstream of electric machine 120, and BISG 142 may be positioned upstream of engine 110, or downstream of engine 110 and upstream of transmission 125.

Figure 3:
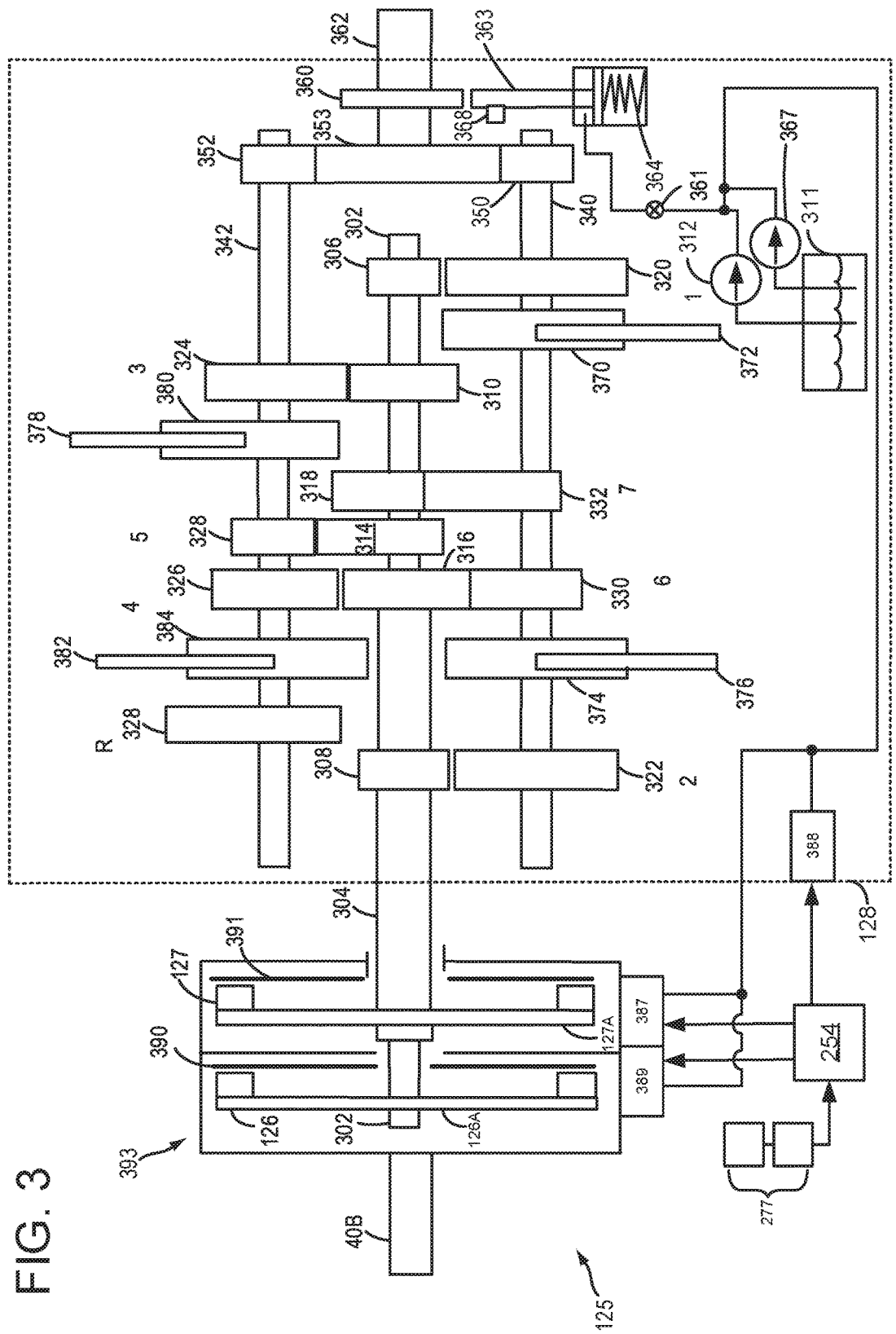
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 328, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 328, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 328, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 340 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 328. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor, which may be utilized by the TCM to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Referring now to FIG. 4, a first example method for operating a hybrid driveline to improve regenerative braking is shown. The method of FIG. 4 may be incorporated into and may cooperate with the system of FIGS. 1A-3. Further, at least portions of the method of FIG. 4 may be incorporated as executable instructions stored in non-transitory memory while other portions of the method may be performed via a controller transforming operating states of devices and actuators in the physical world.

At 402, method 400 judges if a vehicle brake pedal is applied or if an autonomous controller is requesting vehicle braking. Method 400 may judge that a vehicle brake pedal is applied in response to a position of a brake pedal. Method 400 may also judge if vehicle braking is being requested in response to a value of a parameter in controller memory. If method 400 judges that a brake pedal is applied, the answer is yes and method 400 proceeds to 404. Otherwise, the answer is no and method 400 proceeds to 440.

At 440, method 400 operates the integrated starter/generator (e.g., 142 of FIG. 1A) and the electric machine (e.g., 120 of FIG. 1A) included in the rear drive unit according to demand torque (e.g., torque requested via a human and an accelerator pedal, or torque required via an automated driver) and other vehicle operating conditions. For example, the integrated starter/generator may supply torque to start engine 110 of FIG. 1A. The electric machine included in the rear drive unit may provide a portion of demand torque to the driveline to propel the vehicle. Method 400 proceeds to exit.

At 404, method 400 determines an amount of a vehicle braking torque request (Tq_brkReq). In one example, the amount of the braking torque requested is determined in response to a brake pedal position. For example, output of a brake pedal position sensor may be input to a function that outputs an amount of vehicle braking torque to slow the vehicle or hold the vehicle in a stopped state. Method 400 proceeds to 406 after determining the amount of braking torque requested.

At 406, method 400 determines various vehicle limits for regenerative braking. In particular, method 400 determines a regenerative torque limit or threshold responsive to battery charge (Tq_battChrgLim). In one example, the regenerative torque limit responsive to battery charge is output from a table or function of empirically determined regenerative torque limits that are extracted from the table or function via indexing the table or function using battery state of charge. The regenerative torque limit or threshold is a not to be exceeded regenerative torque amount. The not to be exceeded regenerative torque amount constrains torque produced via the rear drive unit electric machine, or by the ISG, or by a combination of the rear drive unit electric machine and the ISG while the rear drive unit and/or ISG produce electrical charge using the vehicle's kinetic energy.

Method 400 also determines a rear drive unit electric machine torque limit or threshold (Tq_mtrLimP3). The rear drive unit electric machine torque limit is a not to be exceeded rear drive unit torque when the rear drive unit is producing electrical charge using the vehicle's kinetic energy. In one example, a table or function of empirically determined values is indexed via electric machine temperature and the table or function outputs a rear drive unit electric machine torque limit or threshold.

Method 400 also determines a regenerative torque limit or threshold responsive to vehicle stability, method 400 determines the regenerative torque limit or threshold responsive to vehicle stability conditions (Tq_vehSta). In one example, the regenerative torque limit responsive to vehicle stability is output from a table or function of empirically determined regenerative torque limits that are extracted from the table or function via indexing the table or function using vehicle stability parameters (e.g., vehicle yaw rate, vehicle lateral acceleration, vehicle longitudinal acceleration). The regenerative torque limit or threshold is a not to be exceeded regenerative torque amount. The not to be exceeded regenerative torque amount constrains torque produced via the rear drive unit electric machine, or by the ISG, or by a combination of the rear drive unit electric machine and the ISG while the rear drive unit and/or ISG produce electrical charge using the vehicle's kinetic energy. Method 400 proceeds to 408 after determining the vehicle regenerative torque limits or thresholds.

At 408, method 400 determines the requested regenerative braking torque (e.g., torque produced via an electric machine while the electric machine is producing charge from the vehicle's kinetic energy) for the rear drive unit electric machine (Tq_regReqP3). The requested regenerative braking torque for the rear drive unit electric machine may be determined via selecting the greater of the amount of a vehicle braking torque request (Tq_brkReq) and the greater amount of the regenerative torque limit or threshold responsive to battery charge (Tq_battChrgLim), the rear drive unit electric machine torque limit or threshold (Tq_mtrLimP3), and the regenerative torque limit or threshold responsive to vehicle stability conditions (Tq_vehSta). This may be mathematically expressed as:

$$Tq\_regReqP3=\max(Tq\_brkReq,\max(Tq\_battChrgLim,Tq\_mtrLimP3,Tq\_vehSta))$$

where max is a function that outputs a value of the least negative (e.g., smallest magnitude of negative braking torques) of the arguments input to the function max. Note that the argument values are negative and indicated in the following example. For example, if Tq_brkReq=−650 Nm, Tq_battChrgLim=−400 Nm, Tq_mtrLimP3=−500 Nm, and Tq_vehSta=−340 Nm, the first use of the max (e.g., max (Tq_battChrgLim, Tq_mtrLimP3, Tq_vehSta) outputs a value of −340 Nm. The second use of the max function (e.g., max(Tq_brkReq, −340 Nm), where the −340 Nm is the output of the first use of the max function) outputs a value of −340 Nm providing the value of Tq_vehSta since the value of Tq_vehSta is a lower magnitude than −650 Nm. Method 400 proceeds to 410 after determining the regenerative braking torque for the rear drive unit electric machine.

At 410, method 400 judges if the requested regenerative braking torque for the rear drive unit electric machine (Tq_regReqP3) is substantially equal (e.g., within +5 percent) to the rear drive unit electric machine torque limit or threshold (Tq_mtrLimP3). This may be mathematically expressed as:

$$Tq\_regReqP3 \approx Tq\_mtrLimP3$$

If the requested regenerative braking torque for the rear drive unit electric machine (Tq_regReqP3) is equal to the rear drive unit electric machine torque limit or threshold (Tq_mtrLimP3), the answer is yes and method 400 proceeds to 412. Otherwise, the answer is no and method 400 proceeds to 430.

At 430, method 400 provides regenerative braking solely via the rear drive unit electric machine. The rear drive unit electric machine provides the regenerative braking torque responsive to the amount of braking torque requested. Method 400 proceeds to exit after providing regenerative braking torque solely via the rear drive unit electric machine.

At 412, method 400 determines an expected regenerative braking torque for the integrated starter/generator to provide (Tq_regenP0Exp) so that the integrated starter/generator and the rear drive unit electric machine provide the potential regenerative braking torque. The expected regenerative braking torque for the integrated starter/generator at the vehicle wheels is determined via selecting the greater of the regenerative torque limit or threshold responsive to battery charge (Tq_battChrgLim), the vehicle braking torque request (Tq_brkReq), and the regenerative torque limit or threshold responsive to vehicle stability conditions (Tq_vehSta) and subtracting the requested regenerative braking torque for the rear drive unit electric machine (Tq_regReqP3) from the result. This may be mathematically expressed as:

$$Tq\_regenP0Exp=\max(-Tq\_battChrgLim,-Tq\_brkReq,-Tq\_vehSta)-Tq\_regReqP3$$

where (Tq_regenP0Exp) is the expected integrated starter/generator torque at the vehicle wheels; max where max is a function that outputs a value of the least negative (e.g., smallest magnitude of negative braking torques) of the arguments Tq_battChrgLim, Tq_brkReq, Tq_vehSta; and Tq_regReqP3 is the requested regenerative braking torque for the rear drive unit electric machine. Method 400 proceeds to 414 after determining the expected regenerative braking torque for the integrated starter/generator to provide at the vehicle wheels.

At 414, method 400 determines an amount of expected regeneration power for the integrated starter/generator produced at the vehicle wheel (P_regenP0). In one example, the amount of expected regeneration power for the integrated starter/generator produced at the wheel is the wheel speed multiplied by the expected integrated starter/generator torque at the vehicle wheels (Tq_regenP0Exp). This may be mathematically expressed as:

$$P\_regenP0=Tq\_regenP0Exp*Spd\_whl$$

where P_regenP0 is the expected regeneration power for the integrated starter/generator produced at the vehicle wheel, Spd_whl is the wheel speed, and Tq_regenP0Exp is the expected integrated starter/generator torque at the vehicle wheels. Method 400 proceeds to 416.

At 416, method 400 identifies a desired integrated starter/generator speed to produce constant power at a high efficiency threshold (Spd_mtrPODes). As discussed with regard to FIG. 7, a high efficiency region of integrated starter/generator may be a speed region in a constant power output region of the integrated starter/generator. A speed (e.g., S2 shown in FIG. 7) for operating the integrated starter/generator in a highly efficient operating region may be empirically determined and stored in memory as a desired speed (Spd_mtrPODes), and a corresponding constant power output of the integrated starter/generator (P_constP0) at the desired speed may also be stored to memory. Method 400 proceeds to 418.

At 418, method 400 determines a gear engage in the transmission based on the integrated starter/generator constant power output (P_constP0) to operate under specified conditions. In particular, if the absolute value of expected regeneration power for the integrated starter/generator produced at the vehicle wheel (P_regenP0) is greater than or equal to the absolute value of integrated starter/generator constant power output (P_constP0), then the transmission is downshifted from a presently engaged gear to a next lower gear to increase engine and integrated starter/generator speed. For example, if abs(P_regenP0)>=abs(P_constP0) and the transmission is engaged in third gear, then the transmission is downshifted into second gear, where abs is a function that determines an absolute value of the argument being processed (e.g., P_regenP0 or P_constP0). However, if abs(P_regenP0)<=abs(P_constP0) and the transmission is engaged in third gear, then the transmission remains in third gear. Method 400 shifts the transmission into a gear responsive to the above equations, then method 400 proceeds to 420.

At 420, method 400 determines the integrated starter/generator regenerative torque. The integrated starter/generator regenerative torque may be determined via the following equation:

$$Tq\_POMtr=\min(abs(P\_regenP0),abs(P\_constP0))/Spd\_mtr$$

where Tq_POMtr is the commanded torque of the integrated starter/generator, min is a function that outputs a lower value of two arguments (e.g., P_regenP0 and P_constP0), abs is a function that outputs an absolute value of an argument, and Spd_mtr is the speed of the integrated starter/generator. The integrated starter/generator is commanded to the integrated start/generator regenerative torque and the rear drive unit electric machine is commanded to the requested regenerative braking torque for the rear drive unit electric machine (Tq_regReqP3). Method 400 proceeds to exit.

In this way, both the integrated starter/generator and the rear drive unit electric machine may convert a vehicle's kinetic energy into electrical energy and store the electrical energy. Further, priority for converting the vehicle's kinetic energy is given to the rear drive unit electric machine so as to use the integrated starter/generator as a secondary regenerative braking device.

Referring now to FIG. 5, a second example method for operating a hybrid driveline to improve regenerative braking is shown. The method of FIG. 5 may be incorporated into and may cooperate with the system of FIGS. 1A-3. Further, at least portions of the method of FIG. 5 may be incorporated as executable instructions stored in non-transitory memory while other portions of the method may be performed via a controller transforming operating states of devices and actuators in the physical world.

At 502, method 500 judges if a vehicle brake pedal is applied or if an autonomous controller is requesting vehicle braking. Method 500 may judge that a vehicle brake pedal is applied in response to a position of a brake pedal. Method 500 may also judge if vehicle braking is being requested in response to a value of a parameter in controller memory. If method 500 judges that a brake pedal is applied, the answer is yes and method 500 proceeds to 504 and 550. Otherwise, the answer is no and method 500 proceeds to 540.

At 540, method 500 operates the integrated starter/generator (e.g., 142 of FIG. 1A) and the electric machine (e.g., 120 of FIG. 1A) included in the rear drive unit according to demand torque (e.g., torque requested via a human and an accelerator pedal, or torque required via an automated driver) and other vehicle operating conditions. For example, the integrated starter/generator may supply torque to start engine 110 of FIG. 1A. The electric machine included in the rear drive unit may provide a portion of demand torque to the driveline to propel the vehicle. Method 500 proceeds to exit.

At 504, method 500 determines an amount of a vehicle braking torque request. In one example, the amount of the braking torque requested is determined in response to a brake pedal position. For example, output of a brake pedal position sensor may be input to a function that outputs an amount of vehicle braking torque to slow the vehicle or hold the vehicle in a stopped state. Method 500 proceeds to 506 after determining the amount of braking torque requested.

At 506, method 500 determines various vehicle limits for regenerative braking. In particular, method 500 determines a regenerative torque limit or threshold responsive to battery charge (Tq_battChrgLim). In one example, the regenerative torque limit responsive to battery charge is output from a table or function of empirically determined regenerative torque limits that are extracted from the table or function via indexing the table or function using battery state of charge. The regenerative torque limit or threshold is a not to be exceeded regenerative torque amount. The not to be exceeded regenerative torque amount constrains torque produced via the rear drive unit electric machine, or by the ISG, or by a combination of the rear drive unit electric machine and the ISG while the rear drive unit and/or ISG produce electrical charge using the vehicle's kinetic energy.

Method 500 also determines a rear drive unit electric machine torque limit or threshold (Tq_mtrLimP3). The rear drive unit electric machine torque limit is a not to be exceeded rear drive unit torque when the rear drive unit is producing electrical charge using the vehicle's kinetic energy. In one example, a table or function of empirically determined values is indexed via electric machine temperature and the table or function outputs a rear drive unit electric machine torque limit or threshold.

Method 500 also determines a regenerative torque limit or threshold responsive to vehicle stability, method 500 determines the regenerative torque limit or threshold responsive to vehicle stability conditions (Tq_vehSta). In one example, the regenerative torque limit responsive to vehicle stability is output from a table or function of empirically determined regenerative torque limits that are extracted from the table or function via indexing the table or function using vehicle stability parameters (e.g., vehicle yaw rate, vehicle lateral acceleration, vehicle longitudinal acceleration). The regenerative torque limit or threshold is a not to be exceeded regenerative torque amount. The not to be exceeded regenerative torque amount constrains torque produced via the rear drive unit electric machine, or by the ISG, or by a combination of the rear drive unit electric machine and the ISG while the rear drive unit and/or ISG produce electrical charge using the vehicle's kinetic energy. Method 500 proceeds to 508 after determining the vehicle regenerative torque limits or thresholds.

At 508, method 500 determines the requested regenerative braking torque (e.g., torque produced via one or more electric machines while the electric machines are producing charge from the vehicle's kinetic energy) (Tq_regReq). The requested regenerative braking torque may be determined via selecting the greater of the amount of a vehicle braking torque request (Tq_brkReq) and the greater amount of the regenerative torque limit or threshold responsive to battery charge (Tq_battChrgLim), the rear drive unit electric machine torque limit or threshold (Tq_mtrLimP3), and the regenerative torque limit or threshold responsive to vehicle stability conditions (Tq_vehSta). This may be mathematically expressed as:

$$Tq\_regReq = \max(Tq\_brkReq, \max(Tq\_battChrgLim, Tq\_mtrLimP3, Tq\_vehSta))$$

where max is a function that outputs a value of the least negative (e.g., smallest magnitude of negative braking torques) of the arguments input to the function max. Note that the argument values are negative and indicated in the following example. For example, if Tq_brkReq=−650 Nm, Tq_battChrgLim=−400 Nm, Tq_mtrLimP3=−300 Nm, and Tq_vehSta=−240 Nm, the first use of the max (e.g., max (Tq_battChrgLim, Tq_mtrLimP3, Tq_vehSta) outputs a value of −240 Nm. The second use of the max function (e.g., max(Tq_brkReq, −240 Nm), where the −240 Nm is the output of the first use of the max function) outputs a value of −240 Nm providing the value of Tq_vehSta since the value of Tq_vehSta is the least negative of the two values. Method 500 proceeds to 510 after determining the regenerative braking torque for the rear drive unit electric machine.

At 510, method 500 determines battery or electric energy storage device charging power provided from requested regenerative braking torque (e.g., torque to provide electric charge produced via the one or more electric machines of the driveline from the vehicle's kinetic energy). The power provided via the regenerative braking torque may be expressed mathematically as:

$$P\_regen = Tq\_regReq * Spd\_whl$$

where P_regen is the electrical power provided via regenerative braking and Spd_whl is the wheel speed of the braking wheel. Method 500 proceeds to 511.

At 550, method 500 determines a total driver demand torque (Tq_drvTot), the high voltage battery state of charge (SoC), and vehicle speed (vspd). In one example, method 500 determines the total driver demand torque based on positions of the accelerator pedal and the brake pedal. Specifically, position of the accelerator pedal is input to a function and the function outputs an empirically determined value of a driveline torque request (e.g., a positive torque request). Similarly, position of the brake pedal is input to a function and the function outputs an empirically determined value of a braking torque (e.g., a negative torque). The braking torque may be added to the driveline torque request to provide the total driver demand torque. Method 500 proceeds to 552.

At 552, method 500 determines a desired high voltage battery (e.g., 132 of FIG. 1A) charging power (P_battChrgDes). In one example, method 500 determines a desired high voltage battery charging power via indexing a function using the total driver demand torque, the high voltage battery state of charge, and vehicle speed. The function holds empirically determined values of desired high voltage battery charging power and the function outputs a value of desired high voltage battery charging power when indexed via the total driver demand torque, the high voltage battery state of charge, and vehicle speed. Method 500 proceeds to 511.

At 511, method 500 judges if the absolute value of the regenerative braking torque (Tq_regReq) is less than the absolute value of the rear drive unit electric machine torque limit or threshold (Tq_mtrLimP3). If so, the answer is yes and method 500 proceeds to 512. Otherwise, the answer is no and method 500 proceeds to 530.

At 530, method 500 does not increase engine output to charge the battery or electric energy storage device. However, the rear drive unit electric machine is commanded to provide the regenerative braking torque (Tq_regReq) divided by the rear drive unit electric machine final drive gear ratio based on Tq_regReq being a wheel torque. The rear drive unit electric machine charges the battery or electric energy storage device with an amount of power corresponding to the regenerative braking torque (P_regen) or less. Method 500 proceeds to exit.

At 512, method 500 judges if the absolute value of the charging power contributed from regenerative braking (P_regen) is less than the absolute value of the desired high voltage battery charging power (P_battChrgDes). If so, the answer is yes and method 500 proceeds to 514. Otherwise, the answer is no and method 500 proceeds to 535.

At 535, method 500 does not increase engine output to charge the battery or electric energy storage device, but the rear drive unit electric machine is commanded to provide the regenerative braking torque (Tq_regReq) divided by the rear drive unit electric machine final gear ratio. The rear drive unit electric machine charges the battery or electric energy storage device with an amount of power corresponding to the regenerative braking torque (P_regen) or less. The rear drive unit electric machine provides charge to the battery or electric energy device by converting only torque from vehicle wheels to electric charge. Method 500 proceeds to exit.

At 514, method 500 determines additional charge that may be provided to the battery or electric energy storage device (P_battChrgAdd). The additional charge may be determined via subtracting the power generated from regenerative braking from the desired high voltage battery charging power. The additional charge may be mathematically described as:

$$P\_battChrgAdd = P\_battChrgDes - P\_regen$$

where P_battChrgAdd is the additional charge that may be provided to the battery or electric energy storage device. Method 500 proceeds to 516.

At 516, method 500 determines a desired engine speed in response to an engine efficiency map and the additional charge that may be provided to the battery or electric energy storage device (P_battChrgAdd). In one example, engine speeds and engine torque combinations at which the engine provides power equivalent to P_battChrgAdd are determined based on the equation: EngP=EngT*Spd_eng, where EngP is engine power output, EngT is engine torque output, and Spd_eng is engine speed. The engine torque and speed pairs for which the engine provides power equivalent to P_battChrgAdd are input to a function that returns an engine efficiency when indexed via each of the engine torque and speed pairs. The function houses empirically determined values of engine efficiency. The engine speed that provides the highest efficiency output from the function is selected as desired engine speed (Spd_engDes). Method 500 proceeds to 518.

At 518, method 500 determines a desired transmission gear. In one example, the present vehicle speed is determined via wheel speed sensors and the transmission output shaft speed is determined by multiplying the wheel speed by the axle ratio. A desired transmission gear is determined from a shift schedule stored in memory. The shift schedule includes empirically determined gears and the shift schedule outputs a desired transmission gear in response to transmission output shaft speed and desired engine speed (Spd_engDes). Method 500 proceeds to 520.

At 520, method 500 executes a gear shift and provides engine torque to charge the battery or electric energy storage device at the desired engine speed. The transmission is shifted to a gear that provides an engine speed closest to the desired engine speed Spd_engDes at the present vehicle speed. The engine torque may be determined via dividing P_battChrgAdd by Spd_engDes. The rear drive unit electric machine torque is commanded to a value equal to the engine torque multiplied by the ratio of the gear engaged in the transmission and the axle ratio (e.g., final drive ratio) plus Tq_regReq divided by the final drive ratio. In addition, method 500 commands the rear drive unit electric machine torque. The rear drive unit electric machine torque is commanded to a value P_battChrgDes divided by the rear drive unit final drive ratio (e.g., the gear ratio between the rear drive unit and the wheel). Method 500 proceeds to exit.

In this way, electrical charge provided by the rear drive unit electric machine to the battery or electric energy storage device may be provided solely via regeneration torque (e.g., torque provided via the vehicle wheels to the rear drive unit electric machine) or via regeneration torque and engine torque during engine braking conditions. By converting engine torque into electric charge, the electric change may be used at a later time to improve driveline torque response.

Referring now to FIG. 6, a third example method for operating a hybrid driveline to improve regenerative braking is shown. The method of FIG. 6 may be incorporated into and may cooperate with the system of FIGS. 1A-3. Further, at least portions of the method of FIG. 6 may be incorporated as executable instructions stored in non-transitory memory while other portions of the method may be performed via a controller transforming operating states of devices and actuators in the physical world.

At 602, method 600 judges if a vehicle brake pedal is applied or if an autonomous controller is requesting vehicle braking. Method 600 may judge that a vehicle brake pedal is applied in response to a position of a brake pedal. Method 600 may also judge if vehicle braking is being requested in response to a value of a parameter in controller memory. If method 600 judges that a brake pedal is applied, the answer is yes and method 600 proceeds to 604 and 650. Otherwise, the answer is no and method 600 proceeds to 640.

At 640, method 600 operates the integrated starter/generator (e.g., 142 of FIG. 1A) and the electric machine (e.g., 120 of FIG. 1A) included in the rear drive unit according to demand torque (e.g., torque requested via a human and an accelerator pedal, or torque required via an automated driver) and other vehicle operating conditions. For example, the integrated starter/generator may supply torque to start engine 110 of FIG. 1A. The electric machine included in the rear drive unit may provide a portion of demand torque to the driveline to propel the vehicle. Method 600 proceeds to exit.

At 604, method 600 determines an amount of a vehicle braking torque request. In one example, the amount of the braking torque requested is determined in response to a brake pedal position. For example, output of a brake pedal position sensor may be input to a function that outputs an amount of vehicle braking torque to slow the vehicle or hold the vehicle in a stopped state. Method 600 proceeds to 606 after determining the amount of braking torque requested.

At 606, method 600 determines various vehicle limits for regenerative braking. In particular, method 600 determines a regenerative torque limit or threshold responsive to battery charge (Tq_battChrgLim). In one example, the regenerative torque limit responsive to battery charge is output from a table or function of empirically determined regenerative torque limits that are extracted from the table or function via indexing the table or function using battery state of charge. The regenerative torque limit or threshold is a not to be exceeded regenerative torque amount. The not to be exceeded regenerative torque amount constrains torque produced via the rear drive unit electric machine, or by the ISG, or by a combination of the rear drive unit electric machine and the ISG while the rear drive unit and/or ISG produce electrical charge using the vehicle's kinetic energy.

Method 600 also determines a rear drive unit electric machine torque limit or threshold (Tq_mtrLimP3). The rear drive unit electric machine torque limit is a not to be exceeded rear drive unit electric machine torque when the rear drive unit is producing electrical charge using the vehicle's kinetic energy. In one example, a table or function of empirically determined values is indexed via rear drive unit electric machine temperature and the table or function outputs an integrated starter/alternator torque limit or threshold.

Method 600 also determines a regenerative torque limit or threshold responsive to vehicle stability, method 600 determines the regenerative torque limit or threshold responsive to vehicle stability conditions (Tq_vehSta). In one example, the regenerative torque limit responsive to vehicle stability is output from a table or function of empirically determined regenerative torque limits that are extracted from the table or function via indexing the table or function using vehicle stability parameters (e.g., vehicle yaw rate, vehicle lateral acceleration, vehicle longitudinal acceleration). The regenerative torque limit or threshold is a not to be exceeded regenerative torque amount. The not to be exceeded regen-erative torque amount constrains torque produced via the rear drive unit electric machine, or by the ISG, or by a combination of the rear drive unit electric machine and the ISG while the rear drive unit and/or ISG produce electrical charge using the vehicle's kinetic energy. Method 600 proceeds to 608 after determining the vehicle regenerative torque limits or thresholds.

At 608, method 600 determines the requested regenerative braking torque (e.g., torque produced via one or more electric machines while the electric machines are producing charge from the vehicle's kinetic energy) (Tq_regReq). The requested regenerative braking torque may be determined via selecting the greater of the amount of a vehicle braking torque request (Tq_brkReq) and the greater amount of the regenerative torque limit or threshold responsive to battery charge (Tq_battChrgLim), the rear drive unit electric motor torque limit or threshold (Tq_mtrLimP3), and the regenerative torque limit or threshold responsive to vehicle stability conditions (Tq_vehSta). This may be mathematically expressed as:

$$Tq\_regReq=\max(Tq\_brkReq,\max(Tq\_battChrgLim, Tq\_mtrLimP3,Tq\_vehSta))$$

where max is a function that outputs a value of the least negative (e.g., smallest magnitude of negative braking torques) of the arguments input to the function max. Note that the argument values are negative and indicated in the following example. For example, if Tq_brkReq=−650 Nm, Tq_battChrgLim=−400 Nm, Tq_mtrLimP3=−450 Nm, and Tq_vehSta=−540 Nm, the first use of the max (e.g., max (Tq_battChrgLim, Tq_mtrLimP3, Tq_vehSta) outputs a value of −400 Nm. The second use of the max function (e.g., max(Tq_brkReq, −400 Nm), where the −400 Nm is the output of the first use of the max function) outputs a value of −400 Nm providing the value of Tq_battChrgLim since the value of Tq_battChrgLim is greater than −650 Nm. Method 600 proceeds to 610 after determining the regenerative braking torque for the rear drive unit electric machine.

At 610, method 600 determines battery or electric energy storage device charging power provided from requested regenerative braking torque (e.g., torque to provide electric charge produced via the one or more electric machines of the driveline). The power provided via the regenerative braking torque may be expressed mathematically as:

$$P\_regen=Tq\_regReq*Spd\_whl$$

where P_regen is the electrical power provided via regenerative braking and Spd_whl is the wheel speed of the braking wheel. Method 600 proceeds to 612.

At 650, method 600 determines a total driver demand torque (Tq_drvTot), the high voltage battery state of charge (SoC), and vehicle speed (vspd). In one example, method 600 determines the total driver demand torque based on positions of the accelerator pedal and the brake pedal. Specifically, position of the accelerator pedal is input to a function and the function outputs an empirically determined value of a driveline torque request (e.g., a positive torque request). Similarly, position of the brake pedal is input to a function and the function outputs an empirically determined value of a braking torque (e.g., a negative torque). The braking torque may be added to the driveline torque request to provide the total driver demand torque. Method 600 proceeds to 652.

At 652, method 600 determines a desired high voltage battery (e.g., 132 of FIG. 1A) charging power (P_battChrgDes). In one example, method 600 determines a desired high voltage battery charging power via indexing a function using the total driver demand torque, the high voltage battery state of charge, and vehicle speed. The function holds empirically determined values of desired high voltage battery charging power and the function outputs a value of desired high voltage battery charging power when indexed via the total driver demand torque, the high voltage battery state of charge, and vehicle speed. Method 600 proceeds to 612.

At 612, method 600 judges if the absolute value of the power provided via the regenerative braking torque (P_regen) is less than the absolute value of the desired high voltage battery charging power (P_battChrgDes). If so, the answer is yes and method 600 proceeds to 614. Otherwise, the answer is no and method 600 proceeds to 630.

At 630, method 600 does not increase engine output to charge the battery or electric energy storage device. However, the rear drive unit electric machine may provide the regenerative braking torque (Tq_regReq) and charge the battery or electric energy storage device with an amount of power corresponding to the regenerative braking torque (P_regen) or less. Method 600 proceeds to exit.

At 614, method 600 determines additional charge that may be provided to the battery or electric energy storage device (P_battChrgAdd). The additional charge may be determined via subtracting the power generated from regenerative braking from the desired high voltage battery charging power. The additional charge may be mathematically described as:

$$P\_battChrgAdd = P\_battChrgDes - P\_regen$$

where P_battChrgAdd is the additional charge that may be provided to the battery or electric energy storage device. Method 600 proceeds to 616.

At 616, method 600 determines a desired engine speed in response to an engine efficiency map and the additional charge that may be provided to the battery or electric energy storage device (P_battChrgAdd). In one example, engine speed is selected as follows:

If $P\_battChrgAdd >=$ the constant power of the $P0$ motor, then $P0$ motor speed $> P0$ base speed where the P0 motor is the integrated starter/generator, and P0 base speed is motor speed where the motor is in a constant power region. The engine speed is determined from the integrated starter/generator and a pulley ratio between the engine and the integrated starter/generator. Thus, speed of the integrated starter/generator is adjusted to a speed greater than a base speed of the integrated starter/generator when the additional charging power is greater than or equal to a power output of the integrated starter/generator when the integrated starter/generator is operated in a constant power output region. However, if:

If $P\_battChrgAdd <$ the constant power of the $P0$ motor, then select the $P0$ motor speed and engine speed at best motor/engine efficiency to deliver $P\_batChrgAdd$ where best motor/engine efficiency is motor/engine efficiency greater than a threshold. Method 600 proceeds to 618.

At 618, method 600 judges if the urgency to deliver the charge power is high. In one example, method 600 judges that the urgency to deliver the charge power is high if battery state of charge is less than a threshold. If method 600 judges that the urgency to deliver the charge power is high, the answer is yes and method 600 proceeds to 620. Otherwise, the answer is no and method 600 proceeds to 624.

At 620, method 600 adjusts engine torque at the engine's present speed to provide the additional charging power (P_battChrgAdd) via the integrated starter/generator. The engine torque may be determined and commanded to a value according to the following mathematical equation:

$$Tq\_eng = P\_battChrgAdd / Spd\_engAct / (eff\_eng * eff\_mtr)$$

where Tq_eng is the commanded engine torque, P_battChrgAdd is the additional charge that may be provided to the battery or electric energy storage device, Spd_engAct is the actual or present engine speed, eff_eng is the engine efficiency, "/" is a division operator, * is a multiplication operator, and eff_mtr is the integrated starter/generator efficiency.

The rear drive unit electric machine is commanded to the value of Tq_regReq multiplied by an axle or final drive ratio. In addition, the integrated starter/generator is commanded to a torque equal to a value of P_battChrgAdd/Pu_ratio, where P_battChrgAdd is the additional charge that may be provided to the battery or electric energy storage device, and Pu_ratio is a pulley ratio between the engine and the integrated starter generator. Method 600 proceeds to exit after commanding the engine torque and the integrated starter/generator torque.

At 624, method 600 adjusts engine torque for a desired engine speed to provide the additional charging power (P_battChrgAdd) via the integrated starter/generator. The engine torque may be determined and commanded to a value according to the following mathematical equation:

$$Tq\_eng = P\_battChrgAdd / Spd\_engDsd / (eff\_eng * eff\_mtr)$$

where Tq_eng is the commanded engine torque, P_battChrgAdd is the additional charge that may be provided to the battery or electric energy storage device, Spd_engDsd is the desired engine speed, eff_eng is the engine efficiency, "/" is a division operator, * is a multiplication operator, and eff_mtr is the integrated starter/generator efficiency.

Method 600 proceeds to exit after commanding the engine torque and the integrated starter/generator torque. Method 600 proceeds to exit after commanding the engine torque and the integrated starter/generator torque.

In this way, electrical charge provided by the integrated starter/generator to the battery or electric energy storage device may be provided via adjusting engine torque during braking. The engine may increase battery charging when power provided via regenerative braking is less than an amount of power a battery may store. Thus, battery charging may be assigned priority and be charged even when power produced via regenerative braking may be low.

Thus, the methods of FIGS. 4-6 provide for a driveline operating method, comprising: charging an electric energy storage device solely via a rear drive unit electric machine in response to a regenerative torque of the rear drive unit electric machine not being substantially equal to a rear drive unit electric machine torque threshold; and charging an electric energy storage device via the rear drive unit electric machine and an integrated starter/generator in response to a regenerative torque of the rear drive unit electric machine being substantially equal to the rear drive unit electric machine torque threshold. The method further comprises determining a torque of the integrated starter/generator to an integrated starter/generator regenerative torque determined from subtracting the regenerative torque of the rear drive unit electric machine from a greater value of one of a requested braking torque, a battery charging threshold torque, and a vehicle stability torque.

In some examples, the method further comprises producing a regenerative braking power at the integrated starter/generator. The method further comprises determining a transmission gear that increases a speed of the integrated starter/generator to a value greater than a desired integrated starter/generator speed. The method includes where the regenerative torque of the rear drive unit electric machine is determined from a requested braking torque. The method further comprising shifting a transmission gear in response to an absolute value of expected regeneration power of the integrated starter/generator being greater than or equal to a constant power output of the integrated starter/generator in a constant power region of the integrated starter/generator, and not shifting the transmission in response to an absolute value of expected regeneration power of the integrated starter/generator produced at a wheel being less than the constant power output of the integrated starter/generator in the constant power region of the integrated starter/generator. The method includes where the regenerative torque of the rear drive unit electric machine is a greater value of one of a requested braking torque, a battery charging threshold torque, a rear drive unit electric machine torque threshold, and a vehicle stability torque.

The methods of FIGS. 4-6 also provide for a driveline operating method, comprising: charging an electric energy storage device solely via a vehicle's kinetic energy in response to an absolute value of regenerative braking power not being less than an absolute value of a desired battery charging power; and charging an electric energy storage device via a vehicle's kinetic energy and engine output torque in response to an absolute value of the regenerative braking power being less than an absolute value of a desired battery charging power. The method further comprises determining an additional charging power provided to the electric energy storage device via the engine output torque. The method includes where the additional charging power is the desired battery charging power minus the regenerative braking power. The method further comprises determining a desired engine speed in response to the additional charging power and an engine efficiency map. The method includes where the regenerative braking power is determined via a regenerative braking torque and wheel speed of a vehicle. The method includes where the regenerative braking torque is a greater value of one of a requested brake torque, a rear drive unit electric machine torque threshold, a regenerative battery charging torque threshold, and a vehicle torque stability threshold. The method includes where the desired battery charging power is a function of vehicle speed, driver demand torque, and battery state of charge.

The methods of FIGS. 4-6 also provide for a driveline operating method, comprising: charging an electric energy storage device solely via a vehicle's kinetic energy in response to an absolute value of regenerative braking power not being less than an absolute value of a desired battery charging power; charging an electric energy storage device via a vehicle's kinetic energy and engine output torque in response to an absolute value of the regenerative braking power being less than an absolute value of a desired battery charging power; and adjusting engine torque in response to an urgency to charge the electric energy storage device when charging the electric energy storage device via the vehicle's kinetic energy and engine output torque. The method includes where the urgency is determined in response to battery state of charge. The method further comprises adjusting the engine torque in response to actual engine speed when the urgency is high. The method further comprises adjusting the engine torque in response to a desired engine speed when the urgency is not high. The method further comprises determining an additional charging power provided to the electric energy storage device via the engine output torque and an integrated starter/generator. The method includes where the additional charging power is the desired battery charging power minus the regenerative braking power and further comprising: adjusting speed of the integrated starter/generator to a speed greater than a base speed of the integrated starter/generator when the additional charging power is greater than or equal to a power output of the integrated starter/generator when the integrated starter/generator is operated in a constant power output region.

Referring now to FIG. 7, example characteristic curves for an electric machine (e.g., an integrated starter/alternator) are shown. The first plot from the top of FIG. 7 is a plot of electric machine torque versus electric machine speed. The vertical axis represents electric machine torque and electric machine torque is positive (e.g., providing torque to the driveline) above the horizontal axis and negative (e.g., absorbing torque from the driveline to produce electric charge) below the horizontal axis. The electric machine torque increases positively in the direction of the axis arrow pointing to the top of the figure. The electric machine torque increases negatively in the direction of the arrow pointing to the bottom of the figure. The horizontal axis represents electric machine speed and speed increases in from the vertical axis in the direction of the horizontal axis arrow.

The second plot from the top of FIG. 7 is a plot of electric machine power versus electric machine speed. The vertical axis represents electric machine power and electric machine power is positive (e.g., providing power to the driveline) above the horizontal axis and negative (e.g., absorbing power from the driveline to produce electric charge) below the horizontal axis. The electric machine power increases positively in the direction of the axis arrow pointing to the top of the figure. The electric machine power increases negatively in the direction of the arrow pointing to the bottom of the figure. The horizontal axis represents electric machine speed and speed increases in from the vertical axis in the direction of the horizontal axis arrow.

Curve 702 shows electric machine torque when the electric machine is operating as an alternator at rated or full field winding current. The electric machine provides a constant torque at low speeds and the torque decreases toward zero torque in response to increasing electric machine speed.

Curve 704 shows that electric machine electric power output when the electric machine is operating as an alternator at rated or full field winding current. The electric machine power increases as electric machine speed increases, and then electric machine power is substantially constant (e.g., ±5% variation) after electric machine speed is greater than speed S1. The efficiency of the electric machine, engine, and transmission may be highest in the region between speed S1 and speed S3. Thus, it may be desirable to operate the electric machine (e.g., the integrated starter/generator) at a speed S2 that lies in the region between speed S1 and speed S3 to maintain efficient integrated starter/alternator operation.

Referring now to FIG. 8, a driveline operating sequence according to the method of FIG. 4 is shown. The first plot from the top of FIG. 8 is a plot of requested braking torque versus time. The vertical axis represents requested braking torque and requested braking torque magnitude increases in the direction of the vertical axis arrow. The horizontal axis represents time and time increases from the left side of the figure to the right side of the figure.

The second plot from the top of FIG. 8 is a plot of rear drive unit electric machine brake torque including adjustments for final drive gear ratio versus time. The vertical axis represents rear drive unit electric machine braking torque including final drive gear ratio adjustments and rear drive unit electric machine brake torque magnitude increases in the direction of the vertical axis arrow. The horizontal axis represents time and time increases from the left side of the figure to the right side of the figure. Horizontal line 802 represents a threshold rear drive unit brake torque that is not to be exceeded.

The third plot from the top of FIG. 8 is a plot of integrated starter/generator brake torque including adjustments for transmission gear and final drive ratio versus time. The vertical axis represents integrated starter/generator brake torque including adjustments for transmission gear and final drive ratio and the integrated starter/generator braking torque magnitude increases in the direction of the vertical axis arrow. The horizontal axis represents time and time increases from the left side of the figure to the right side of the figure.

At time T0, the requested brake torque is zero and so is the rear drive unit brake torque. The integrated starter/generator brake torque is also zero. The requested brake torque magnitude increases at time T1 in response to a human or autonomous driver requesting braking via a brake pedal or a signal (not shown). The torque magnitude of the rear drive unit electric machine is increased to meet the requested brake torque. Since the brake torque request is less than the capacity of the rear drive unit electric machine (e.g., threshold 802), all braking torque is provided via the rear drive unit electric machine and the integrated starter/generator torque is zero. The requested braking torque magnitude is reduced at time T2 and the rear drive unit electric machine torque magnitude decreases as the requested braking torque magnitude is reduced. The integrated starter/generator torque remains at zero.

At time T3, the requested braking torque magnitude increases a second time and the rear drive unit electric machine torque provides the requested braking torque without assistance from the integrated starter/generator until time T4. Thus, the rear drive unit electric machine torque magnitude increases at time T3 with the requested braking torque magnitude. The integrated starter/generator torque magnitude remains at zero.

At time T4, the requested braking torque magnitude continues to increase and the rear drive unit electric machine torque magnitude reaches threshold 802 so that rear drive unit electric machine torque magnitude remains at a level of threshold 802. The integrated starter/generator torque magnitude is increased at time T4 to provide additive torque to the rear drive unit electrical machine torque magnitude so that the requested braking torque may be met. The integrated starter/generator brake torque magnitude follows the portion of requested brake torque magnitude that is greater than threshold 802. The sum of the rear drive unit electric machine brake torque magnitude and the integrated starter/generator torque magnitude is equal to the requested brake torque magnitude.

At time T5, the requested braking torque magnitude is decreased in response to a decrease in driver demand torque (not shown). The integrated starter/generator braking torque magnitude is reduced to zero and the rear drive unit electric machine torque magnitude begins to decrease as the requested braking torque decreases.

In this way, the rear drive unit electric machine torque and the integrated starter/generator torque are adjusted to provide a requested braking torque. The rear drive unit electric machine provides braking torque at a higher priority level than the integrated starter/generator, but the integrated starter/generator augments rear drive unit electric machine torque when rear drive unit electric machine torque is equal to a threshold.

Referring now to FIG. 9, a driveline operating sequence according to the method of FIG. 5 is shown. The traces are shown as positive values for illustration purposes. The first plot from the top of FIG. 9 is a plot of requested braking regeneration power versus time. The vertical axis represents requested braking regeneration power and requested braking regeneration power increases in the direction of the vertical axis arrow. The horizontal axis represents time and time increases from the left side of the figure to the right side of the figure. The requested braking regeneration power is derived from a requested braking torque and vehicle wheel speed.

The second plot from the top of FIG. 9 is a plot of desired battery charging power versus time. The vertical axis represents desired battery charging power and desired battery charging power increases in the direction of the vertical axis arrow. The horizontal axis represents time and time increases from the left side of the figure to the right side of the figure.

The third plot from the top of FIG. 9 is a plot of battery charging power added to regeneration power to meet the desired battery charging power versus time. The vertical axis represents battery charging power added to regenerative charging power and battery charging power added to regenerative charging power increases in the direction of the vertical axis arrow. The horizontal axis represents time and time increases from the left side of the figure to the right side of the figure.

The fourth plot from the top of FIG. 9 is a plot of engine power versus time. The vertical axis represents engine power output and engine power output increases in the direction of the vertical axis arrow. The horizontal axis represents time and time increases from the left side of the figure to the right side of the figure.

At time T10, engine power is at a middle level and driver releases the accelerator pedal (not shown) which stops engine combustion. The requested regenerative braking power is zero because no brake pedal is applied. The desired battery charging power is also zero and the battery charging power added to regeneration power to meet the desired battery charging power is zero. Between time T10 and time T11, the driver provides no input to the accelerator pedal or the brake pedal and the vehicle coasts.

At time T11, the driver applies the brake pedal (not shown) and at least part of the driver requested braking torque is provided via regenerative braking (e.g., via the rear drive unit electric machine). The regenerative braking power P_regen charges the high voltage battery.

At time T12, the brake pedal is released and the accelerator pedal is gently applied (not shown). The vehicle is propelled via the rear drive unit electric machine so the charge stored in the high voltage battery is reduced (not shown). The regenerative braking power is zero and the values of the other variables are also zero.

At time T13, the engine is restarted in response to low state of battery charge (not shown). Between time T13 and time T14, the engine power P_Eng trace is shown at a level that is greater than the desired battery charging power P_battChrgDes because the engine is providing power to propel the vehicle and charge the high voltage battery. No regenerative braking is available because no brake pedal is applied.

At time T14, the accelerator pedal is released (not shown) and the vehicle brake pedal is applied (not shown) so that regenerative braking is requested. The rear drive unit electric machine provides at least a portion of the requested braking power.

Between time T14 and time T15, engine power P_Eng is reduced since the engine is no longer providing power to propel the vehicle and the high voltage battery begins to charge via regeneration power P_regen. The desired battery charging power P_battChrgDes is reduced in response to the increasing amount of charge stored in the high voltage battery. Engine output power P_Eng is reduced to zero and the engine is stopped when the desired battery charging power P_battChrgDes is reduced to a level where regenerative braking power P_regen is greater than or equal to the desired battery charging power P_battChrgDes.

In this way, an engine may be activated and its power may be converted into charge stored in a battery so that the battery has a higher level of charge stored as compared to if charge where provided to the battery only via regenerative braking. Consequently, battery state of charge may be held at a higher level to meet high driver demand levels.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
charging an electric energy storage device solely via a rear drive unit electric machine in response to a regenerative torque of the rear drive unit electric machine not being substantially equal to a rear drive unit electric machine torque threshold; and
charging the electric energy storage device via the rear drive unit electric machine and an integrated starter/generator in response to the regenerative torque of the rear drive unit electric machine being substantially equal to the rear drive unit electric machine torque threshold;
wherein the regenerative torque of the rear drive unit electric machine is a greater value of one of a requested braking torque, a battery charging threshold torque, the rear drive unit electric machine torque threshold, and a vehicle stability torque.

2. The method of claim 1, further comprising determining a torque of the integrated starter/generator to an integrated starter/generator regenerative torque determined from subtracting the regenerative torque of the rear drive unit electric machine from a greater value of one of the requested braking torque, the battery charging threshold torque, and the vehicle stability torque.

3. The method of claim 2, further comprising determining a regenerative braking power and producing the regenerative braking power at the integrated starter/generator, the integrated starter/generator coupled to an engine.

4. The method of claim 3, further comprising determining a transmission gear that increases a speed of the integrated starter/generator to a value greater than a desired integrated starter/generator speed.

5. The method of claim 1, where the regenerative torque of the rear drive unit electric machine is determined from a requested braking torque.

6. The method of claim 1, further comprising shifting a transmission gear in response to an absolute value of expected regeneration power of the integrated starter/generator produced at a wheel being greater than or equal to a constant power output of the integrated starter/generator in a constant power region of the integrated starter/generator, and not shifting the transmission near in response to the absolute value of expected regeneration power of the integrated starter/generator produced at the wheel being less than the constant power output of the integrated starter/generator in the constant power region of the integrated starter/generator.

7. A driveline operating method, comprising:
charging an electric energy storage device solely via a vehicle's kinetic energy in response to an absolute value of a regenerative braking power not being less than an absolute value of a desired battery charging power; and charging the electric energy storage device via the vehicle's kinetic energy and an engine output torque in response to the absolute value of the regenerative braking power being less than the absolute value of a desired battery charging power.

8. The method of claim 7, further comprising determining an additional charging power provided to the electric energy storage device via the engine output torque and not charging the electric energy storage device via the engine output torque in response to an absolute value of a regenerative braking torque not being less than an absolute value of a rear drive unit electric machine torque threshold.

9. The method of claim 8, where the additional charging power is the desired battery charging power minus the regenerative braking power.

10. The method of claim 9, further comprising determining a desired engine speed in response to the additional charging power and an engine efficiency map.

11. The method of claim 7, where the regenerative braking power is determined via a regenerative braking torque and a wheel speed of a vehicle.

12. The method of claim 11, where the regenerative braking torque is a greater value of one of a requested brake torque, a rear drive unit electric machine torque threshold, a regenerative battery charging torque threshold, and a vehicle torque stability threshold.

13. The method of claim 7, where the desired battery charging power is a function of vehicle speed, driver demand torque, and battery state of charge.

14. A driveline operating method, comprising:
charging an electric energy storage device solely via a vehicle's kinetic energy in response to an absolute value of regenerative braking power not being less than an absolute value of a desired battery charging power;
charging an electric energy storage device via a vehicle's kinetic energy and engine output torque in response to the absolute value of the regenerative braking power being less than the absolute value of the desired battery charging power; and
adjusting engine torque in response to an urgency to charge the electric energy storage device when charging the electric energy storage device via the vehicle's kinetic energy and engine output torque.

15. The method of claim 14, where the urgency is based on battery state of charge.

16. The method of claim 15, further comprising adjusting the engine torque in response to actual engine speed when the urgency is high.

17. The method of claim 15, further comprising adjusting the engine torque in response to a desired engine speed when the urgency is not high.

18. The method of claim 15, further comprising determining an additional charging power provided to the electric energy storage device via subtracting the regenerative braking power from the desired battery charging power.

19. The method of claim 18, further comprising adjusting speed of an integrated starter/generator to a speed greater than a base speed of the integrated starter/generator when the additional charging power is greater than or equal to a power output of the integrated starter/generator when the integrated starter/generator is operated in a constant power output region.

* * * * *